US012716751B2

(12) United States Patent
Egawa et al.

(10) Patent No.: US 12,716,751 B2
(45) Date of Patent: Aug. 25, 2026

(54) MAGNETIC SENSOR DEVICE

(71) Applicant: Hirose Electric Co., Ltd., Yokohama (JP)

(72) Inventors: Kosuke Egawa, Yokohama (JP); Makoto Adachi, Yokohama (JP)

(73) Assignee: HIROSE ELECTRIC CO., LTD., Yokohama (JP)

(*) Notice: Subject to any disclaimer, the term of this patent is extended or adjusted under 35 U.S.C. 154(b) by 159 days.

(21) Appl. No.: 18/749,490

(22) Filed: Jun. 20, 2024

(65) Prior Publication Data

US 2024/0426637 A1 Dec. 26, 2024

(30) Foreign Application Priority Data

Jun. 23, 2023 (JP) ................................ 2023-103482

(51) Int. Cl.
*G01D 5/20* (2006.01)
*G01B 7/30* (2006.01)

(52) U.S. Cl.
CPC .................................... *G01D 5/20* (2013.01); *G01B 7/30* (2013.01)

(58) Field of Classification Search
CPC .................................. G01D 5/20; G01B 7/30
See application file for complete search history.

(56) References Cited

U.S. PATENT DOCUMENTS

| | | | | |
|---|---|---|---|---|
| 11,016,061 | B2 * | 5/2021 | Itoi | G01R 33/093 |
| 11,585,677 | B2 * | 2/2023 | Egawa | G01P 3/4815 |
| 11,781,854 | B2 * | 10/2023 | Egawa | G01D 5/20 324/244.1 |

FOREIGN PATENT DOCUMENTS

WO 2016/021074 A1 2/2016

* cited by examiner

*Primary Examiner* — Reena Aurora

(74) *Attorney, Agent, or Firm* — Procopio, Cory, Hargreaves & Savitch LLP

(57) ABSTRACT

The magnetic sensor device 3 comprises a sensor unit 4 and substrate-side connectors 24, 25. The sensor unit 4 comprises a magnetic sensor, a yoke, and a casing 19. The magnetic sensor comprises a magnetic wire rod that generates a large Barkhausen effect, a bobbin having the magnetic wire rod disposed therein, a coil formed by winding an electrical wire around the bobbin, a sensor-side connector provided in the left end portion of the bobbin, and a sensor-side connector provided in the right end portion of the bobbin. The magnetic sensor device 3 is provided on the substrate 35 by mounting the substrate-side connectors 24, 25 to the substrate 35 and, thereafter, connecting the sensor unit 4 to the substrate-side connectors 24, 25.

6 Claims, 11 Drawing Sheets

FIG. 11 (A)
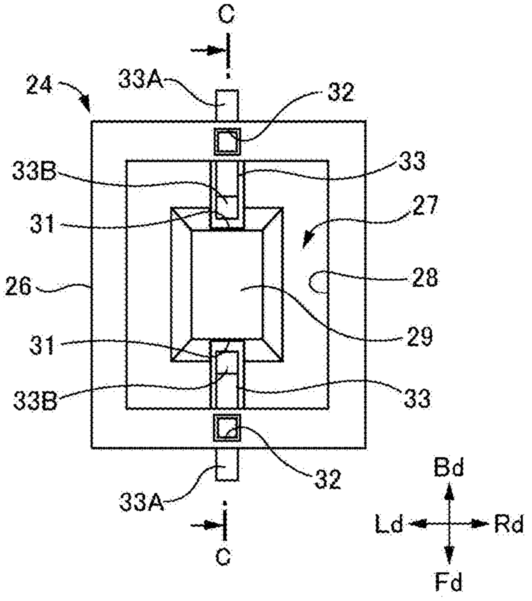
FIG. 11 (B)
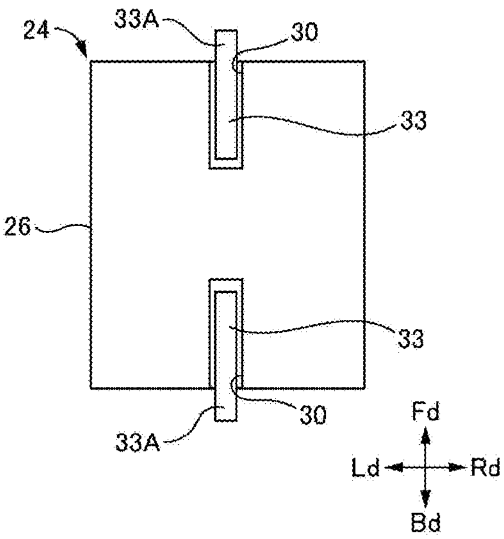
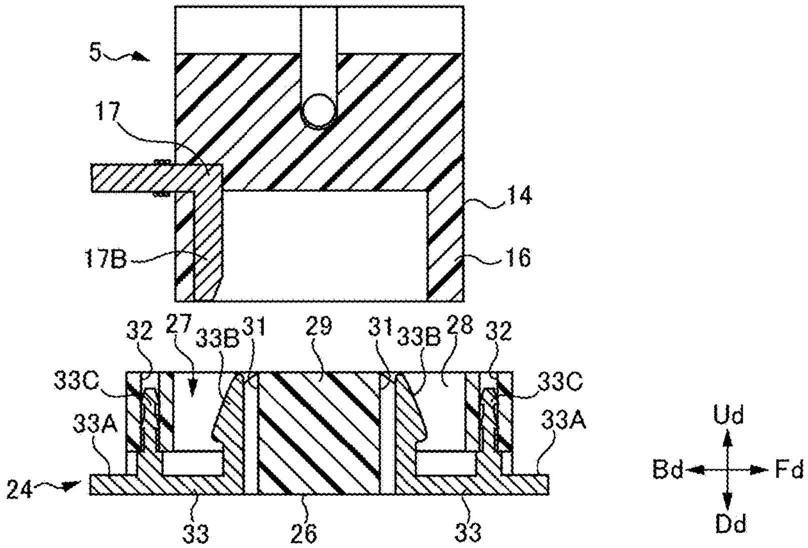
FIG. 12 (A)
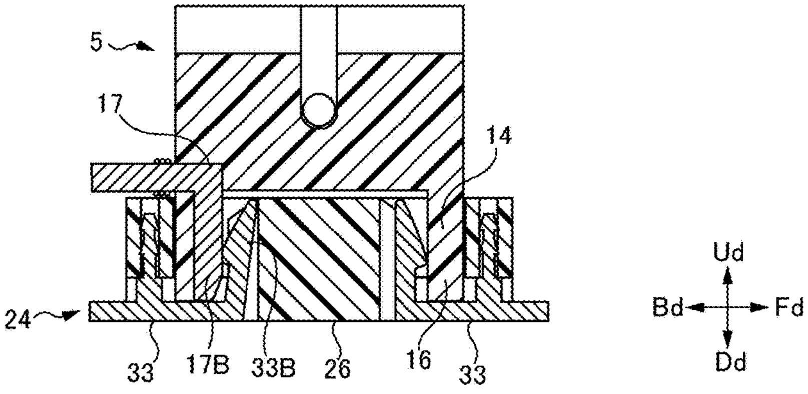
FIG. 12 (B)
C
24
33A
32
33B
33
31
27
26
28
29
30
Bd
Fd
Ld
Rd
Ud
Dd
5
17
17B
14
16
33C 1
3
5
19
35
18
2
S
N
N
S
3
3
40
Bd
Ld
Rd
Fd 3
17
5
6
12
17
18
F
F
F
N
S
40
S
N
2

3
17
5
6
12
17
18
F
F
F
S
N
40
N
S
2
Bd
Ld
Rd
Fd

Electric Current
P1
0
Time
P2

MAGNETIC SENSOR DEVICE

CROSS-REFERENCE TO RELATED APPLICATIONS

This application claims priority to Japanese Patent Application No. 2023-103482, filed Jun. 23, 2023, the contents of which are incorporated herein by reference in its entirety for all purposes.

BACKGROUND

Technical Field

The present invention relates to a magnetic sensor device that utilizes a large Barkhausen effect.

Related Art

A magnetic sensor that utilizes a large Barkhausen effect comprises a magnetic wire rod that generates a large Barkhausen effect, a bobbin having the magnetic wire rod disposed therein, a coil formed by winding an electrical wire around the bobbin, and two terminals used to connect the coil to an external sensing circuit. The two terminals are respectively secured at opposite ends of the bobbin. Of the two terminals, one terminal is connected to one end of the electrical wire that forms the coil, and the other terminal is connected to the other end of the electrical wire that forms the coil. The magnetic sensor is secured to the substrate, for example, by soldering the respective ends of the two terminals to electrically conductive portions provided on the substrate. An example of such a magnetic sensor is described in International Publication No. 2016/021074 (Patent Document 1).

For example, as described in International Publication No. 2016/021074, when magnetic sensors are used for sensing the rotation of a rotary shaft, magnets are secured to the outer perimeter of the rotary shaft such that a rotating magnetic field is formed at the outer periphery of the rotary shaft as the rotary shaft rotates. Further, a substrate is provided at the outer periphery of the rotary shaft so as to be free of contact with the rotary shaft and the magnets, and a plurality of magnetic sensors are provided on the substrate. In addition, the plurality of magnetic sensors are disposed in proximity to the rotational trajectory of the magnets in respectively different positions in the direction of rotation of the magnets. This allows for the rotating magnetic field formed by the rotation of the rotary shaft to be sensed by the plurality of magnetic sensors and for the amount and direction of rotation, etc., of the rotary shaft to be sensed based on detection signals output from the coil of each magnetic sensor.

PATENT DOCUMENTS

Patent Document 1

International Publication No. 2016/021074.

SUMMARY

Problems to be Solved

Substrates having magnetic sensors provided thereon carry a plurality of electrical and electronic components in addition to the magnetic sensors. While a variety of components, such as resistors, capacitors, diodes, transistors, or integrated circuits, etc., are contemplated as such electrical and electronic components, compact surface mounting-type components (chip components) are used as such electrical and electronic components in light of requirements such as substrate area reduction and the like. On the other hand, as described in International Publication No. 2016/021074, conventional magnetic sensor are insertion mounting-type components (DIP components).

The following problems arise when mounting conventional magnetic sensors to a substrate along with other electrical and electronic components.

The construction of a conventional magnetic sensor can be adapted for surface mounting, for example, by modifying the shape of each terminal of the conventional magnetic sensor. However, a magnetic sensor has a larger volume and, for this reason, a larger heat capacity compared to compact surface mounting-type electrical and electronic components. When a plurality of components are surface mounted to a substrate by the reflow soldering technique, the settings or regimens used to handle heating, heat insulation, heat dissipation, and the like in order to perform soldering properly get complicated if there are considerable differences in heat capacity between the plurality of components. For this reason, magnetic sensors and other electrical and electronic components cannot be easily surface mounted to a substrate in one go by the reflow soldering technique. As a result, a separate step of mounting the magnetic sensor to the substrate must be provided in addition to steps used to surface mount other electrical and electronic components to the substrate, which increases the workload required for soldering the magnetic sensor and other electrical and electronic components to the substrate.

In addition, since magnetic sensors are bulkier than compact surface mounting-type electrical and electronic components, the ratio of the area occupied by the magnetic sensor to the area of the substrate becomes larger when a magnetic sensor is provided on the substrate. As a result, the substrate space used to mount other electrical and electronic components becomes smaller and the number of electrical and electronic components that can be mounted to the substrate is reduced.

The present invention has been devised by taking problems such as those described above into consideration, and it is an object of the present invention to provide a magnetic sensor device whereby a magnetic sensor can be readily provided on a substrate along with other electrical and electronic components.

Technical Solution

In order to eliminate the above-described problems, the inventive magnetic sensor device comprises a magnetic sensor, which comprises a magnetic wire rod that generates a large Barkhausen effect, a bobbin having the magnetic wire rod disposed therein, a coil formed by winding an electrical wire around the bobbin, a first connector provided at one end of the bobbin, and a second connector provided at the other end of the bobbin; a third connector detachably connected to the first connector; and a fourth connector detachably connected to the second connector, and is characterized by the fact that the first connector comprises a first mating portion and a first terminal to which one end of the electrical wire is connected, the second connector comprises a second mating portion and a second terminal to which the other end the electrical wire is connected, the third connector comprises a third mating portion mated with the first mating portion and a third terminal making contact with the first terminal upon mating of the first mating portion with the third mating portion, and the fourth connector comprises a fourth mating portion mated with the second mating portion and a fourth terminal making contact with the second terminal upon mating of the second mating portion with the fourth mating portion.

With the use of the aforementioned inventive magnetic sensor device, a magnetic sensor can be provided on the substrate, for example, by mounting the third and fourth connectors to the substrate along with other electrical and electronic components, and, thereafter, respectively connecting the first and second connectors of the magnetic sensor to the third and fourth connectors mounted to the substrate.

The third and fourth connectors can be of the surface mounting type. The third and fourth connectors are each of a smaller size and heat capacity than the magnetic sensor. Therefore, when the third and fourth connectors are surface mounted to the substrate by the reflow soldering technique along with other electrical and electronic components, the settings or regimens used to handle heating, heat insulation, heat dissipation, etc., in order to perform soldering properly become less complicated compared to when the magnetic sensor is surface mounted to the substrate by the reflow soldering technique along with other electrical and electronic components. For this reason, the third connector, fourth connector, and other electrical and electronic components can be readily surface mounted to the substrate in one go by the reflow soldering technique. Accordingly, the soldering workload required when providing the magnetic sensor and other electrical and electronic components on the substrate can be reduced.

Further, in the aforementioned inventive magnetic sensor device, the magnetic sensor can be provided on the substrate, for example, by mounting the third and fourth connectors respectively at two mutually spaced locations on the mounting face of the substrate and respectively connecting the first and second connectors of the magnetic sensor to the third and fourth connectors. In such a case, the magnetic sensor can be provided so as to bridge the span between the third and fourth connectors. Providing the magnetic sensor in this manner allows for a space to be formed between the mounting face of the substrate and the intermediate section in the magnetic sensor between one end thereof where the first connector is provided and the other end thereof where the second connector is provided, in which space other electrical and electronic components can be mounted. Mounting other electrical and electronic components within this space can increase the number of electrical and electronic components that can be mounted to the substrate.

The aforementioned inventive magnetic sensor device may be adapted such that the coil is provided between one end and the other end of the bobbin, the first connector is provided in the bottom portion of one end of the bobbin, the second connector is provided in the bottom portion of the other end of the bobbin, the third connector is provided on the top face of the substrate such that the first mating portion can be mated with the third mating portion from above the third mating portion, the fourth connector is provided on the top face of the substrate such that the second mating portion can be mated with the fourth mating portion from above the fourth mating portion, the third connector and the fourth connector are disposed so as to be spaced apart from each other on the top face of the substrate and, once the first mating portion has been mated with the third mating portion from above the third mating portion and, the second mating portion has been mated with the fourth mating portion from above the fourth mating portion, the magnetic wire rod and the bobbin extend parallel to the top face of the substrate, and a space is formed between the bottom portion of the outer peripheral surface of the coil and the top face of the substrate. In addition, in the aforementioned inventive magnetic sensor device, the third and fourth connector may each be surface mounted to the substrate. In addition, in the aforementioned inventive magnetic sensor device, there may be provided a yoke that controls the direction of the magnetic flux of an external magnetic field, and the yoke may be secured to the magnetic sensor. In addition, in the aforementioned inventive magnetic sensor device, there may be provided a yoke that controls the direction of the magnetic flux of an external magnetic field and a casing in which the magnetic sensor is accommodated, the yoke may be secured to the casing and, in such a case, the yoke may be integrated with the casing by insert molding.

Technical Effect

In accordance with the present invention, a magnetic sensor can be readily provided on a substrate along with other electrical and electronic components.

BRIEF DESCRIPTION OF THE DRAWINGS

FIG. 11(A) is an external top view of a substrate-side connector in the magnetic sensor device according to the inventive embodiment, and FIG. 11(B) is an external bottom view of said substrate-side connector.

FIG. 12(A) is a cross-sectional view of a sensor-side connector and a substrate-side connector in a separated condition, and FIG. 12(B) is a cross-sectional view of the sensor side connector and the substrate-side connector in a connected condition.

DETAILED DESCRIPTION (Rotation Sensing Device)

Figure 1:
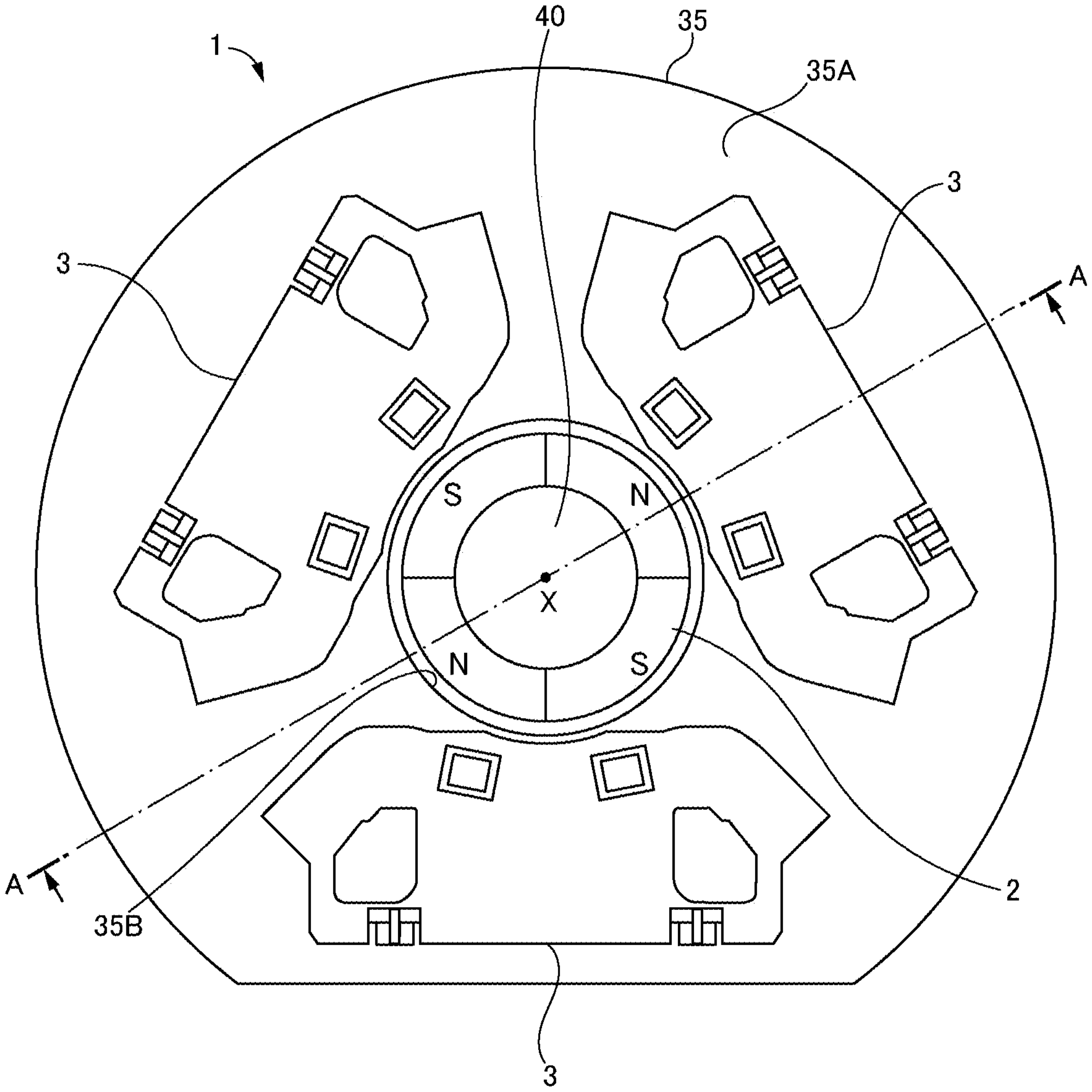
FIG. 1 is an illustrative view of a rotation sensing device comprising a magnetic sensor device according to an inventive embodiment.
Figure 2:
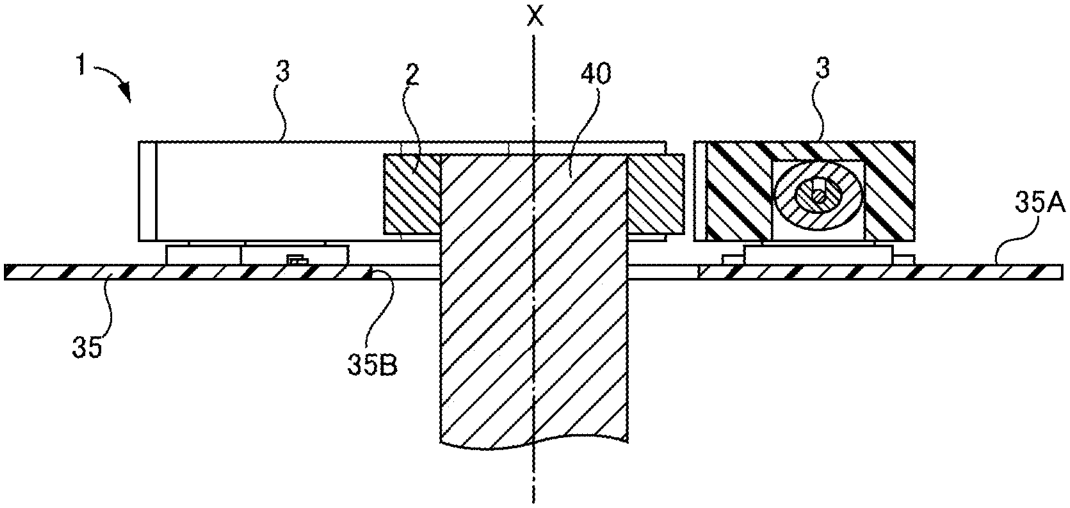
FIG. 2 is a cross-sectional view of a cross-section of the rotation sensing device taken along section line A-A in FIG. 1, as seen from the bottom right of FIG. 1.

FIG. 1 shows a rotation sensing device 1 including a magnetic sensor device 3 according to an inventive embodiment. FIG. 2 shows a cross-section of the rotation sensing device 1 taken along section line A-A in FIG. 1, as seen from the bottom right of FIG. 1.

In FIG. 1, the rotation sensing device 1 is a device that senses the rotation of a rotary shaft 40 serving as a rotating body. The rotation sensing device 1 comprises a magnetic field forming member 2 forming a rotating magnetic field, a plurality of magnetic sensor devices 3 sensing the rotating magnetic field, and a substrate 35.

The magnetic field forming member 2 is formed in an annular configuration from, for example, ferrite or another magnetic material. The magnetic field forming member 2 is disposed at the outer periphery of the rotary shaft 40 coaxially with the rotary shaft 40, and is secured to the rotary shaft 40. The magnetic field forming member 2 is a multi-pole-magnetized magnet, with four magnetic poles, i.e., an N pole, an S pole, an N pole, and an S pole, formed, in this order, in the outer peripheral section of the magnetic field forming member 2 at, for example, 90-degree intervals in the circumferential direction of the magnetic field forming member 2. It should be noted that the magnetic field forming member 2 can be also formed from four magnets that have not been multipole magnetized.

The substrate 35 is provided at the outer periphery of the rotary shaft 40. As shown in FIG. 2, the substrate 35 is disposed such that a plane comprising the mounting face 35A thereof is perpendicular to the axis X of the rotary shaft 40. In addition, a through hole 35B is formed in the central part of the substrate 35, and the rotary shaft 40 is inserted into the through hole 35B. The diameter of the through hole 35B is larger than the outside diameter of the rotary shaft 40, and the rotary shaft 40 does not come into contact with the substrate 35. In addition, the substrate 35 is secured to a housing, etc., of a device (for example, a motor, etc.) in which the rotary shaft 40 is rotatably supported through the medium of brackets and the like.

A plurality of magnetic sensor devices 3 are provided on the mounting face 35A of the substrate 35. As shown in FIG. 1, in the present embodiment, three magnetic sensor devices 3 are provided on the substrate 35. The three magnetic sensor devices 3 are disposed at predetermined intervals (e.g., 120-degree intervals) at the outer periphery of the magnetic field forming member 2. In addition, the three magnetic sensor devices 3 are disposed equidistantly from the axis X of the rotary shaft 40. In addition, each magnetic sensor device 3 is spaced apart from the magnetic field forming member 2. In addition, as shown in FIG. 2, in the axial direction of the rotary shaft 40, the position of each magnetic sensor device 3 substantially corresponds to the position of the magnetic field forming member 2.

The magnetic field forming member 2 rotates along with the rotary shaft 40, whereas each magnetic sensor device 3 is stationary. When the magnetic field forming member 2 rotates along with the rotary shaft 40, the magnetic field formed by the magnetic field forming member 2 is set into rotation. This forms a rotating magnetic field rotating about the axis X of the rotary shaft 40 as the axis of rotation. Each magnetic sensor device 3 senses this rotating magnetic field. Specifically, the direction of the magnetic field acting on each magnetic sensor device 3 is changed by the rotation of the magnetic field formed by the magnetic field forming member 2. Each magnetic sensor device 3 outputs pulse signals corresponding to changes in the direction of this magnetic field. The amount and direction of rotation, etc., of the rotary shaft 40 can be sensed based on the pulse signals output from each magnetic sensor device 3.

In addition, while not depicted in the drawings, a plurality of compact surface mounting-type electrical and electronic components such as, for instance, resistors, capacitors, diodes, transistors, or integrated circuits and the like (referred to as "other electrical and electronic components") are mounted to the mounting face 35A of the substrate 35 in addition to the magnetic sensor devices 3.

(Magnetic Sensor Device)

Figure 3:
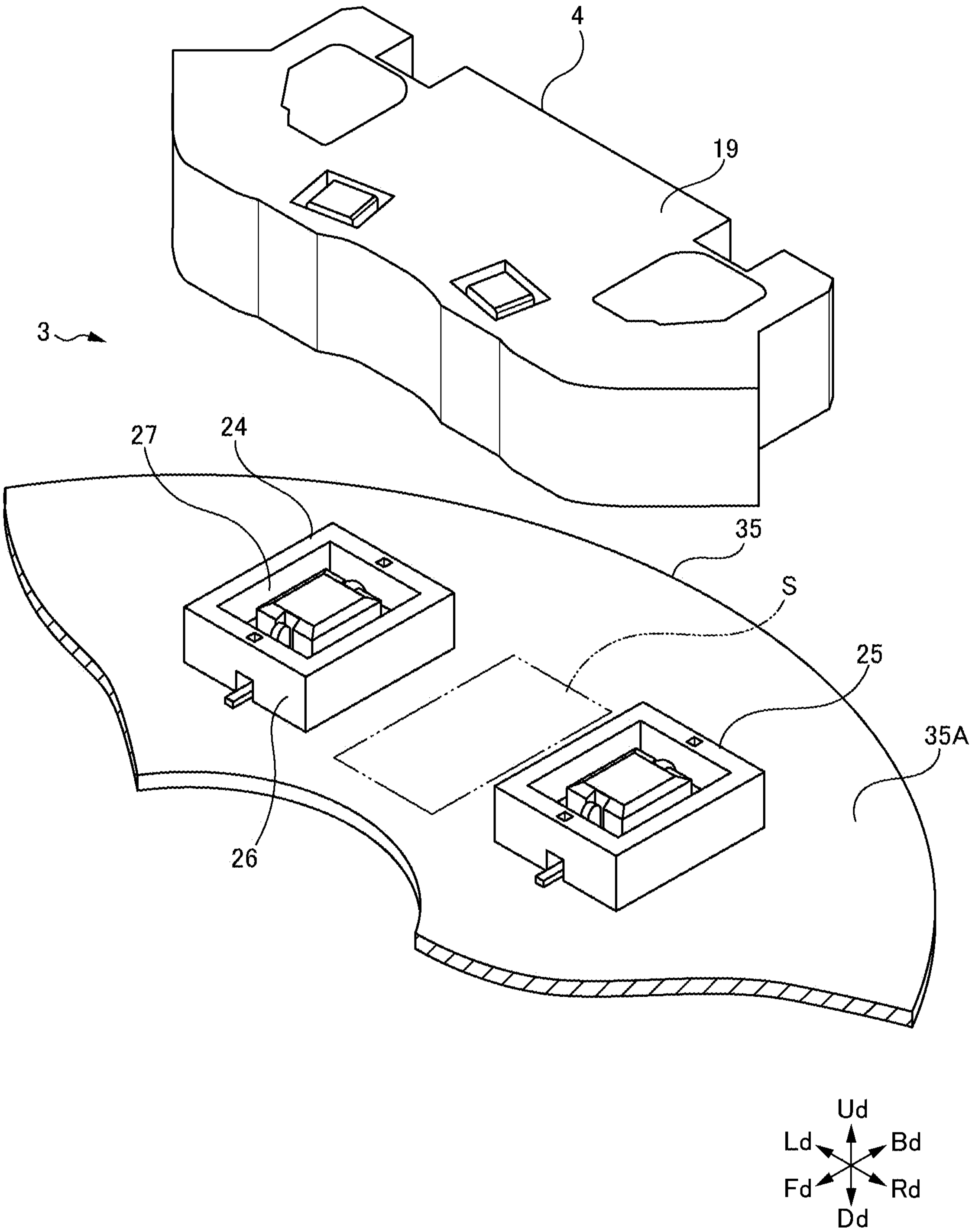
FIG. 3 is a front, top, right perspective view of the magnetic sensor device according to the inventive embodiment.
Figure 4:
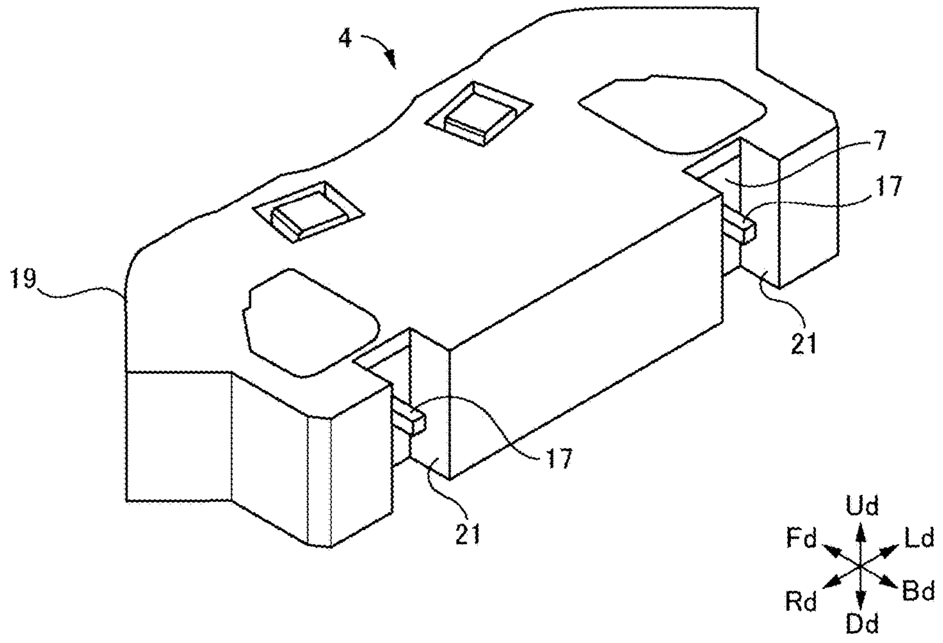
FIG. 4(A) is a rear, top, right perspective view of a sensor unit in the magnetic sensor device according to the inventive embodiment.
FIG. 4(B) is a front, bottom, right perspective view of said sensor unit.
Figure 4:
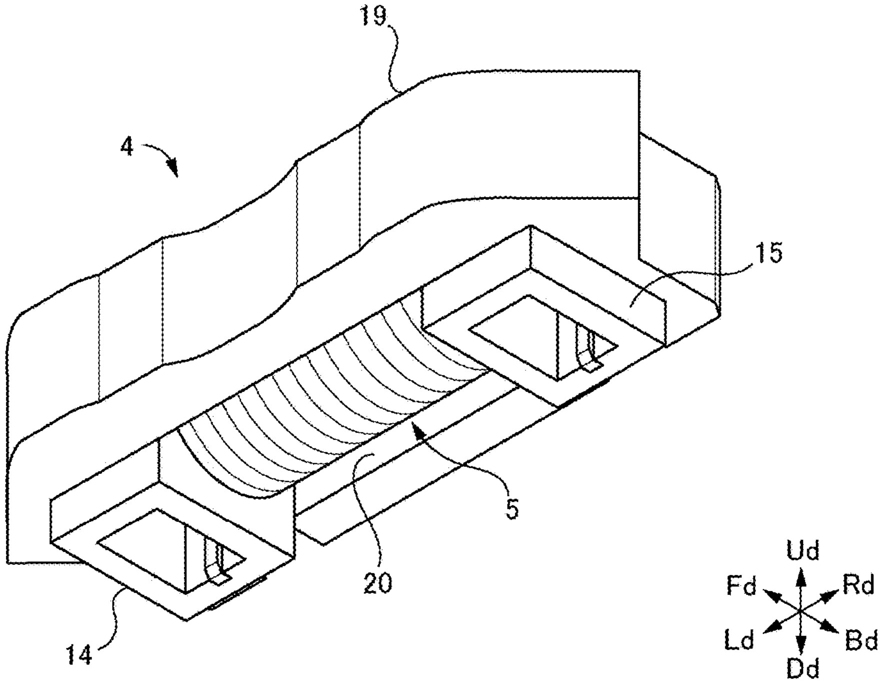

Three identical magnetic sensor devices 3 are provided on the substrate 35 in FIG. 1. FIG. 3 illustrates one of these three magnetic sensor devices 3. This magnetic sensor device 3 is described below, and, in the description, references to directions such as forward (Fd), back (Bd), up (Ud), down (Dd), left (Ld), and right (Rd) are based on the arrows drawn at the bottom right of FIGS. 3-12, 14 and 15.

As shown in FIG. 3, the magnetic sensor device 3 comprises a sensor unit 4 and two substrate-side connectors 24, 25. The substrate-side connectors 24, 25 are mounted to the mounting face 35A of the substrate 35. The sensor unit 4 is provided on the substrate 35 via connection to the substrate-side connectors 24, 25.

(Sensor Unit)

Figure 5:
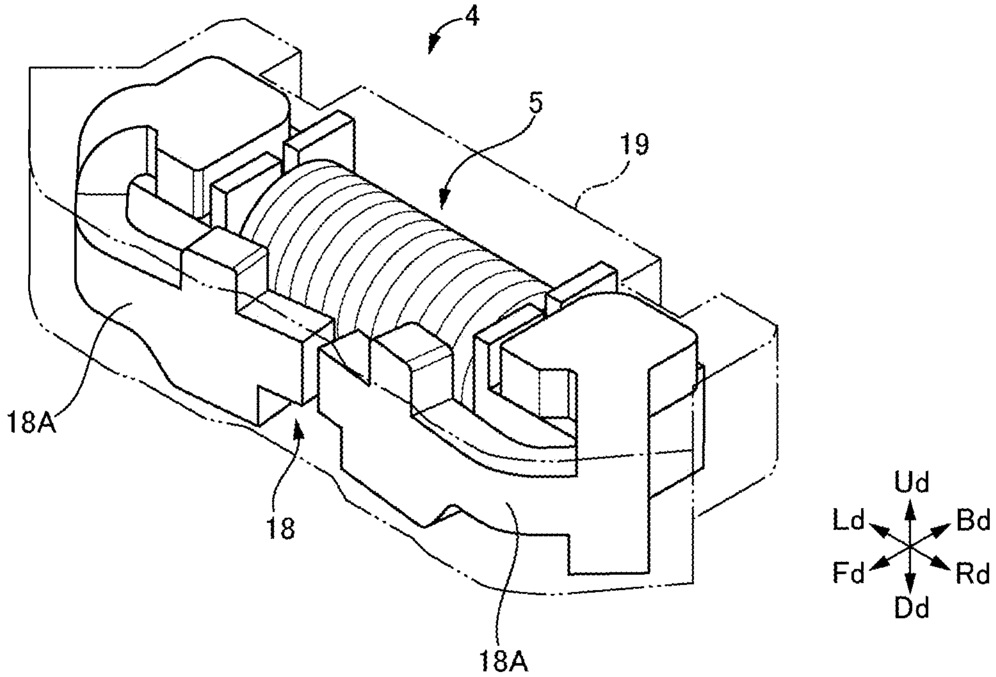
FIG. 5 is a front, top, right illustrative view of the magnetic sensor, yoke, and casing of the sensor unit in the magnetic sensor device according to the inventive embodiment.

FIG. 4(A) is a rear, top, right view of the sensor unit 4. FIG. 4(B) is a front, bottom, right view of the sensor unit 4. FIG. 5 illustrates a magnetic sensor 5, a yoke 18, and a casing 19 forming part of the sensor unit 4. It should be noted that only the outer shape of the casing 19 is indicated in FIG. 5 using a two-dot chain line.

As shown in FIGS. 4(A), 4(B) and 5, the sensor unit 4 comprises a magnetic sensor 5, a yoke 18, and a casing 19, and the magnetic sensor 5 and yoke 18 are provided inside the casing 19.

Figure 6:
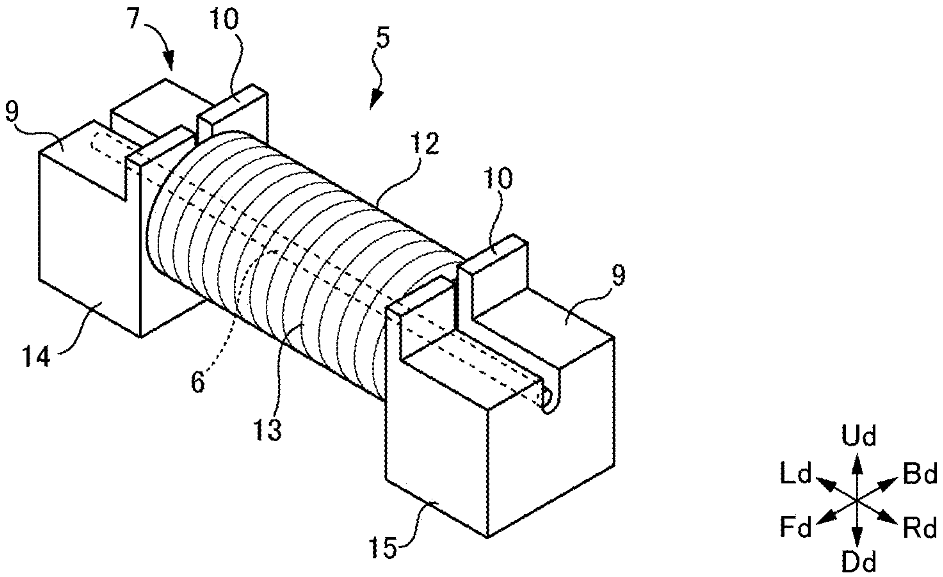
FIG. 6 is a front, top, right perspective view of the magnetic sensor in the magnetic sensor device according to the inventive embodiment.
Figure 7:
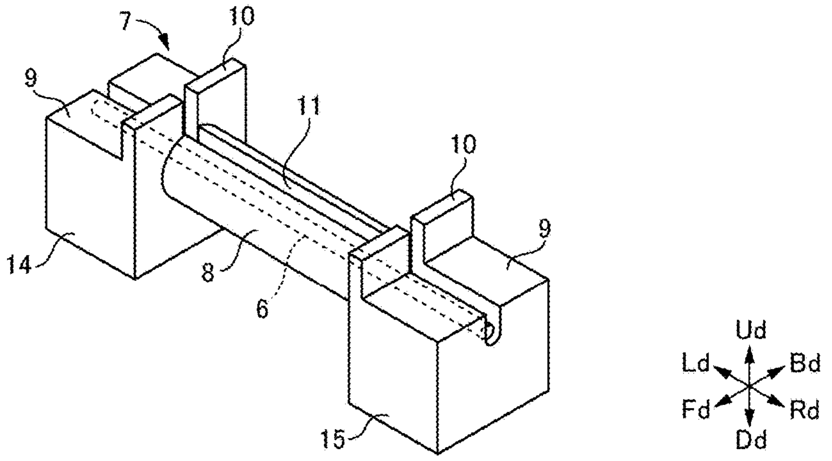
FIG. 7(A) is a front, top, right perspective view of a bobbin in the magnetic sensor of the magnetic sensor device according to the inventive embodiment.
FIG. 7(B) is a rear, bottom, right perspective view of said bobbin.
Figure 7:
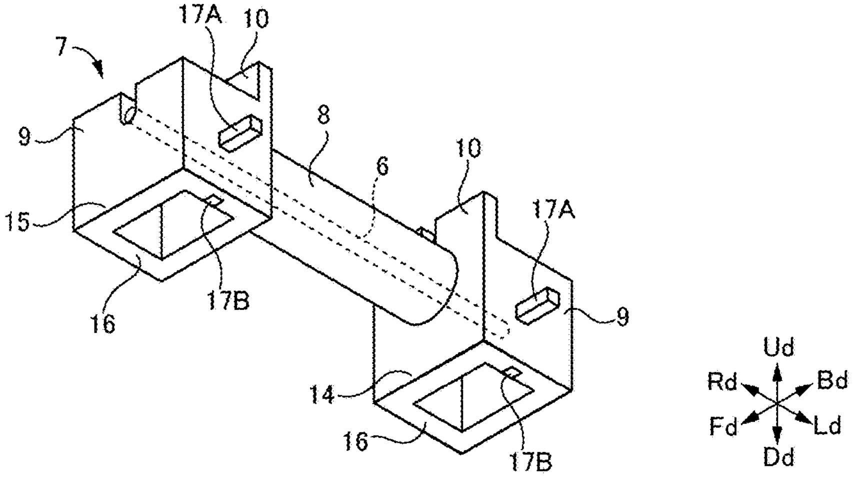
Figure 8:
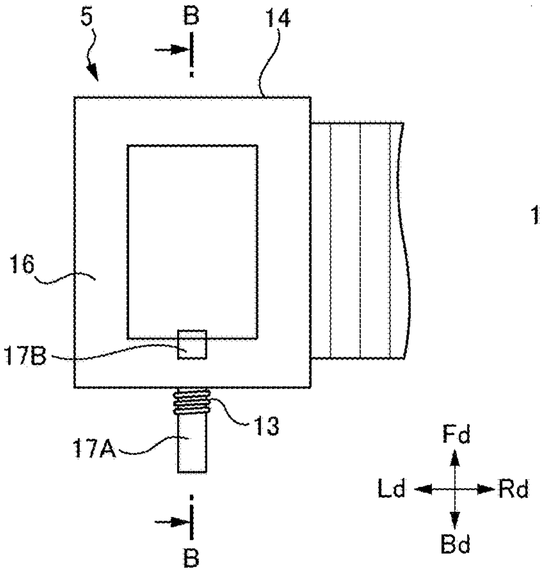
FIG. 8(A) is an external bottom view of the left end portion of the magnetic sensor in the magnetic sensor device according to the inventive embodiment.
FIG. 8(B) is cross-sectional view of the left end portion of the magnetic sensor taken along section line B-B in FIG. 8(A), as viewed from the left.
Figure 8:
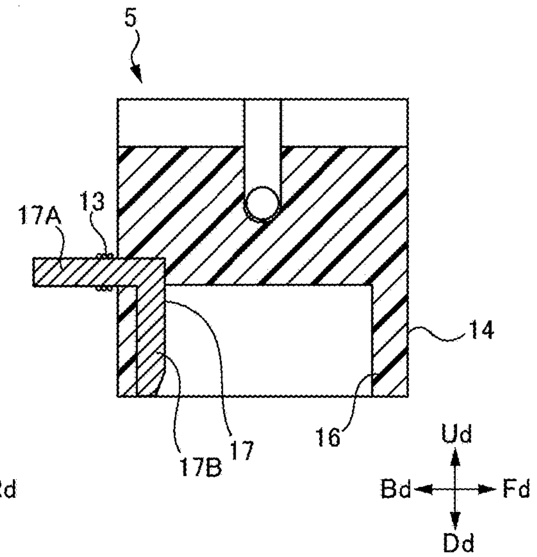

FIG. 6 illustrates the magnetic sensor 5. FIG. 7(A) is a front, top, right view of a bobbin 7 in the magnetic sensor 5. FIG. 7(B) is a rear, bottom, right view of the bobbin 7. FIG. 8(A) is a bottom view of the left end portion of the magnetic sensor 5. FIG. 8(B) illustrates a cross-section of the left end portion of the magnetic sensor 5 taken along section line B-B in FIG. 8(A), as viewed from the left.

In the magnetic sensor device 3, the magnetic sensor 5 is the section that performs the sensing of the aforementioned rotating magnetic field. As shown in FIG. 6, the magnetic sensor 5 comprises a magnetic wire rod 6, a bobbin 7, a coil 12, and two sensor-side connectors 14, 15.

The magnetic wire rod 6, which is a magnetic wire rod that generates a large Barkhausen effect, is called a composite magnetic wire. The magnetic wire rod 6 is a wire rod formed, for example, from a semi-rigid magnetic material containing iron and cobalt, and having a diameter of, for example, approximately 0.1 mm to 1 mm and a length of, for example, approximately 10 mm to 30 mm. The magnetic wire rod 6 is formed, for example, by drawing and twisting the aforementioned semi-rigid magnetic material multiple times while changing the direction. The magnetic wire rod 6 possesses uniaxial anisotropy, in which the direction of easy magnetization is the direction of the central axis of said magnetic wire rod 6. In addition, the coercivity of the magnetic wire rod 6 is higher in the central section than in the outer peripheral section thereof. The magnetic wire rod 6 possesses a property whereby the direction of magnetization of the magnetic wire rod 6 (the outer peripheral section thereof) is abruptly reversed in response to changes in the direction of an external magnetic field.

The bobbin 7 is formed, for example, from a plastics material or another nonmagnetic material. As shown in FIG. 7(A), the bobbin 7 comprises a wire winding portion 8, two wire rod supporting portions 9, two flange portions 10, and a wire rod receiving groove 11. The wire winding portion 8, which is provided in the intermediate part of the bobbin 7 in the left-to-right direction, is formed in a cylindrical configuration extending in the left-to-right direction. The wire rod supporting portions 9 are respectively provided at the right and left ends of the bobbin 7. The flange portions 10 are respectively provided between the wire winding portion 8 and the left-hand wire rod supporting portion 9, and between the wire winding portion 8 and the right-hand wire rod supporting portion 9. Each flange portion 10 is of a larger diameter than the wire winding portion 8. The wire rod receiving groove 11 is a groove extending from the left end to the right end of the bobbin 7.

The magnetic wire rod 6 is disposed within the bobbin 7 so as to extend rectilinearly in the left-to-right direction. Specifically, the magnetic wire rod 6 is disposed within the wire rod receiving groove 11. The left end portion of the magnetic wire rod 6 is supported (secured) in the left end portion of the wire rod receiving groove 11 formed in the left-hand wire rod supporting portion 9 by bonding using adhesives and other means. Likewise, the right end portion of the magnetic wire rod 6 is supported (secured) in the right end portion of the wire rod receiving groove 11 formed in the right-hand wire rod supporting portion 9. It should be noted that a wire rod receiving hole, i.e., a hole extending from the left end to the right end of the bobbin 7, may be provided instead of the wire rod receiving groove 11, and the magnetic wire rod 6 may be disposed within the wire rod receiving hole.

The coil 12 is provided at the outer periphery of the magnetic wire rod 6 disposed within the wire rod receiving groove 11. Specifically, as shown in FIG. 6, the coil 12 is formed by winding an insulated electrical wire 13, for example an enameled wire and the like, around the wire winding portion 8.

As shown in FIG. 7(B), the sensor-side connectors 14, 15 are respectively provided in the left and right end portions of the bobbin 7. Specifically, the sensor-side connector 14 is formed integral with the bottom portion of the left-hand wire rod supporting portion 9 in the bobbin 7. The sensor-side connector 15 is formed integral with the bottom portion of the right-hand wire rod supporting portion 9 in the bobbin 7. In addition, the sensor-side connector 14 protrudes downwardly from the left-hand wire rod supporting portion 9, and the sensor-side connector 15 protrudes downwardly from the right-hand wire rod supporting portion 9. The sensor-side connector 14 is detachably connected to the substrate-side connector 24, and the sensor-side connector 15 is detachably connected to the substrate-side connector 25.

As shown in FIGS. 8(A) and 8(B), the sensor-side connector 14 comprises a mating portion 16 and a terminal 17. The mating portion 16 is mated with a mating portion 27 in the substrate-side connector 24. The mating portion 16 is formed in a cylindrical configuration (e.g., a rectangular cylindrical configuration) protruding downwardly from the left-hand wire rod supporting portion 9. The terminal 17 is formed in an L-curved rod-like configuration from an electrically conductive material, for example a copper alloy or another metallic material. The terminal 17 is disposed in the central part of the rear portion of the mating portion 16 in the left-to-right direction. One end section of the terminal 17 is an electrical wire connecting portion 17A and the other end section of the terminal 17 is a contact portion 17B, with the electrical wire connecting portion 17A extending in the forward-backward direction while the contact portion 17B extends in the up-down direction. The electrical wire connecting portion 17A extends rearwardly from the upper section of the rear portion of the mating portion 16, with the distal end portion thereof protruding outside of the bobbin 7. In addition, one end of the insulated electrical wire 13 is secured and electrically connected to the electrical wire connecting portion 17A. The contact portion 17B is located in the rear portion inside the mating portion 16, extending from the top end to the bottom end of the mating portion 16. It should be noted that the sensor-side connector 14 is a specific example of the "first connector," the mating portion 16 of the sensor-side connector 14 is a specific example of the "first mating portion," and the terminal 17 of the sensor-side connector 14 is a specific example of the "first terminal."

The sensor-side connector 15, which is formed as a mirror image of the sensor-side connector 14, comprises a mating portion 16 and a terminal 17 in a manner similar to the sensor-side connector 14. In addition, the other end of the insulated electrical wire 13 is secured and electrically connected to the electrical wire connecting portion 17A of the terminal 17 of the sensor-side connector 15. It should be noted that the sensor-side connector 15 is a specific example of the "second connector," the mating portion 16 of the sensor-side connector 15 is a specific example of the "second mating portion," and the terminal 17 of the sensor-side connector 15 is a specific example of the "second terminal."

The yoke 18 has the function of controlling the direction of the magnetic flux of an external magnetic field. In the present embodiment, the yoke 18 controls the direction of the magnetic flux of the magnetic field formed by the magnetic field forming portion 2. As shown in FIG. 5, the yoke 18 comprises two yoke pieces 18A. Each yoke piece 18A is formed, for example, from iron or another soft magnetic material. A portion of one yoke piece 18A is disposed in front of the left-hand portion of the magnetic sensor 5, and another portion of the one yoke piece 18A is disposed above the left end portion of the magnetic sensor 5. In addition, a portion of the other yoke piece 18A is disposed in front of the right-hand portion of the magnetic sensor 5, and another portion of the other yoke piece 18A is disposed above the right end portion of the magnetic sensor 5.

Figure 9:
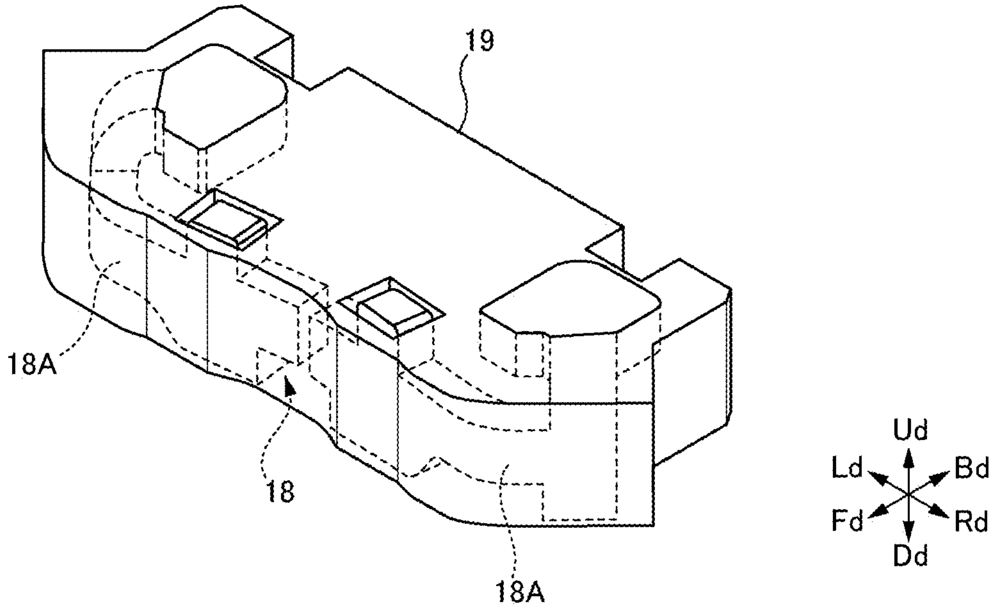
FIG. 9 is a perspective view of the yoke and casing integrated by insert molding in the magnetic sensor device according to the inventive embodiment.
Figure 10:
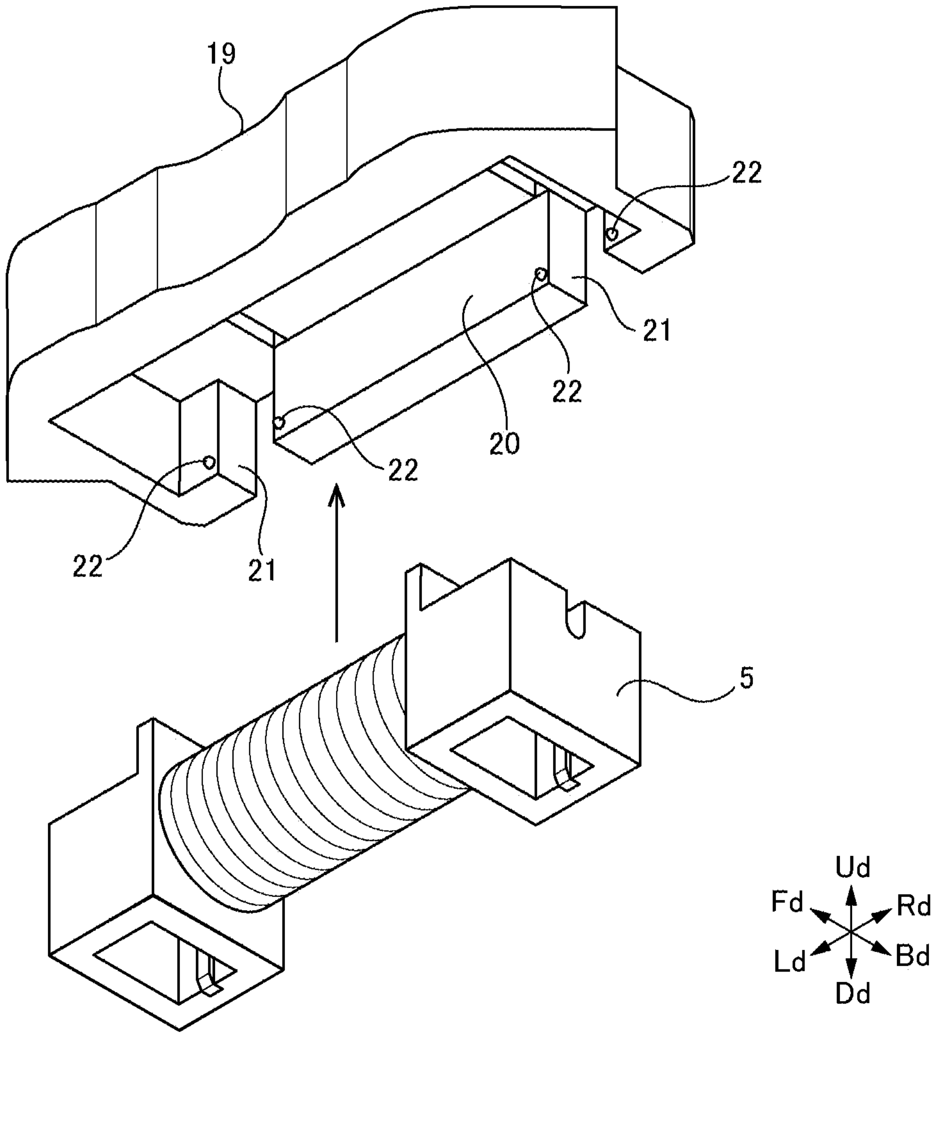
FIG. 10 is an illustrative view of a method for attaching the magnetic sensor to the casing in the magnetic sensor device according to the inventive embodiment.

The casing 19 has the function of integrating the magnetic sensor 5 and the yoke 18. The casing 19 is formed, for example, from a plastics material or another nonmagnetic material. As shown in FIG. 9, the yoke 18 is integrated with the casing 19 by embedding the yoke 18 in the casing 19. Specifically, the yoke 18 is integrated with the casing 19 by insert molding. In addition, as shown in FIG. 10, a sensor receiving portion 20 is provided in the casing 19. The sensor receiving portion 20, which is a hole formed in the bottom face of the casing 19, is downwardly open and has the top portion thereof sealed. As shown in FIG. 4(B), the magnetic sensor 5 is received within the sensor receiving portion 20.

In order for the magnetic sensor 5 to be snugly inserted into the sensor receiving portion 20, the shape of the opening of the sensor receiving portion 20 is a rectangle corresponding to the outer shape and size of the magnetic sensor 5, the dimensions of the sensor receiving portion 20 in the left-to-right direction are substantially equal to the dimensions of the magnetic sensor 5 in the left-to-right direction, and the dimensions of the sensor receiving portion 20 in the forward-backward direction are substantially equal to the dimensions of the left and right end portions of the bobbin 7 of the magnetic sensor 5 in the forward-backward direction. In addition, as shown in FIG. 10, notches 21 are respectively formed in the left and right rear portions of the casing 19. As shown in FIG. 4(A), when the magnetic sensor 5 is inserted into the sensor receiving portion 20, the distal end portion of the terminal 17 protruding rearwardly from the left end portion of the bobbin 7 of the magnetic sensor 5 is disposed inside the notch 21 in the left rear portion of the casing 19, and the distal end portion of the terminal 17 protruding rearwardly from the right end portion of the bobbin 7 of the magnetic sensor 5 is disposed inside the notch 21 in the right rear portion of the casing 19. In addition, as shown in FIG. 10, a plurality of forwardly protruding projections 22 are formed on the rear face of the sensor receiving portion 20. Upon insertion of the magnetic sensor 5 into the sensor receiving portion 20, each projection 22 presses hard against the bobbin 7. This secures the magnetic sensor 5 within the sensor receiving portion 20. When installing the magnetic sensor 5 in the casing 19, the operator press-fits the magnetic sensor 5 into the sensor receiving portion 20.

In addition, as shown in FIG. 4(B), upon installation of the magnetic sensor 5 within the sensor receiving portion 20, the portion of the magnetic sensor 5 other than the sensor-side connectors 14, 15 is disposed within the sensor receiving portion 20, whereas the sensor-side connectors 14, 15 stick out of the sensor receiving portion 20. That is, the sensor-side connectors 14, 15 protrude downwardly from the casing 19.

(Substrate-Side Connectors)

FIG. 11(A) illustrates the substrate-side connector 24 as viewed from above. FIG. 11(B) illustrates the substrate-side connector 24 as viewed from below. FIG. 12(A) illustrates the sensor-side connector 14 and the substrate-side connector 24 of the magnetic sensor 5 in a separated condition. FIG. 12(B) illustrates the sensor-side connector 14 and the substrate-side connector 24 in a connected condition. It should be noted that in FIGS. 12(A) and 12(B) the magnetic sensor 5 is shown as a cross-section of the left end portion of the magnetic sensor 5 taken along section line B-B in FIG. 8(A), as viewed from the left, and the substrate-side connector 24 is shown as a cross-section of the substrate-side connector 24 taken along section line C-C in FIG. 11(A), as viewed from the left.

The sensor-side connector 14 of the magnetic sensor 5 is connected to the substrate-side connector 24. As shown in FIG. 11(A), the substrate-side connector 24 comprises a housing 26 having a mating portion 27 and two terminals 33. It should be noted that the substrate-side connector 24 is a specific example of the "third connector," the "mating portion 27" of the substrate-side connector 24 is a specific example of the "third mating portion," and the "terminals 33" of the substrate-side connector 24 are a specific example the "third terminal."

The housing 26 is formed, for example, from a plastics material or another nonmagnetic material. In addition, as shown in FIG. 3, the housing 26 is formed in a columnar configuration (for example, a rectangular columnar configuration) with the axis thereof extending in the up-down direction. The substrate-side connector 24 of the present embodiment has a low profile, with the dimensions thereof in the up-down direction being smaller than the dimensions thereof in the left-to-right direction or in the forward-backward direction.

The mating portion 27 is provided in the top portion of the housing 26. Specifically, as shown in FIGS. 11(A) and 12(A), the mating portion 27 comprises a bottomed hole 28 formed in the top face of the housing 26 and a protruding portion 29 protruding upwardly from the central part of the bottom face of this hole 28. The mating portion 16 of the sensor-side connector 14 enters the space between the inner peripheral surface of the hole 28 and the outer peripheral surface of the protruding portion 29. The shape of the opening of the hole 28 and the shape of the protruding portion 29 correspond to the shape of the mating portion 16 of the sensor-side connector 14. For example, when the substrate-side connector 24 is viewed from above, the shape of the protruding portion 29 and the shape of the opening of the hole 28 are both rectangular.

In addition, as shown in FIG. 11(B), terminal placement grooves 30 extending in the forward-backward direction are formed in the bottom face of the housing 26 respectively in the front and rear portions located in the center in the left-to-right direction. In addition, as shown in FIG. 11(A), displacement-permitting grooves 31 extending in the up-down direction are formed in the protruding portion 29 of the mating portion 27 in the front and rear portions located in the center in the left-to-right direction. In addition, terminal fixing holes 32 extending in the up-down direction are formed in the housing 26 in the front and rear portions located in the center in the left-to-right direction.

The two terminals 33 are respectively disposed in the front and rear portions of the central part of the housing 26 in the left-to-right direction. As shown in FIG. 12(A), each terminal 33 is formed in an L-curved rod-like configuration from an electrically conductive material, for example a copper alloy or another metallic material. In addition, one end section of the terminal 33 is a substrate connecting portion 33A and the other end section of the terminal 33 is a contact portion 33B, with the substrate connecting portion 33A extending in the forward-backward direction and the contact portion 33B extending in the up-down direction. In addition, in each terminal 33, there is provided an anchoring portion 33C intended for securing the terminal to the housing 26, with the anchoring portion 33C projecting upwardly from the substrate connecting portion 33A.

In the rear-side terminal 33, the substrate connecting portion 33A is disposed within the terminal placement groove 30 formed in the rear portion of the bottom face of the housing 26. The substrate connecting portion 33A extends along the bottom face of the housing 26, with the distal end portion thereof rearwardly protruding from inside the terminal placement groove 30 and sticking out of the housing 26. The contact portion 33B is disposed in a position proximate to the rear face of the protruding portion 29 and extends from inside the terminal placement groove 30 to the top face of the housing 26 along the rear face of the protruding portion 29. In addition, the contact portion 33B is positioned rearwardly of the displacement-permitting groove 31 (in the present embodiment, part of the contact portion 33B is within the displacement-permitting groove 31). In addition, an anchoring portion 33C is inserted within the terminal fixing hole 32 formed in the rear portion of the housing 26. The anchoring portion 33C has formed therein an engaging piece, and said anchoring portion 33C is secured within the terminal fixing hole 32 due to the fact that the engaging piece engages the inner peripheral surface of the terminal fixing hole 32. This secures the rear-side terminal 33 to the housing 26.

The front-side terminal 33 is disposed with front-to-back symmetry relative to the rear-side terminal 33. Namely, in the front-side terminal 33, the substrate connecting portion 33A is disposed within the terminal placement groove 30 formed in the front portion of the bottom face of the housing 26, with the distal end portion thereof protruding forwardly from inside the terminal placement groove 30. In addition, the contact portion 33B is disposed in a position proximate to the front face of the protruding portion 29 and is positioned forwardly of the displacement-permitting groove 31. In addition, the anchoring portion 33C is secured within the terminal fixing hole 32 formed in the front portion of the housing 26, thereby securing the front-side terminal 33 to the housing 26.

As shown in FIG. 3, the magnetic sensor device 3 has two substrate-side connectors 24, 25, with the substrate-side connector 25 being identical to the substrate-side connector 24. It should be noted that the substrate-side connector 25 is a specific example of the "fourth connector," the "mating portion 27" of the substrate-side connector 25 is a specific example of the "fourth mating portion," and the "terminals 33" of the substrate-side connector 25 are a specific example of the "fourth terminal."

As shown in FIG. 12(B), the mating portion 16 of the sensor-side connector 14 provided in the left end portion of the bobbin 7 of the magnetic sensor 5 enters the mating portion 27 of the substrate-side connector 24, thereby mating the two portions with each other. The sensor-side connector 14 is secured to the substrate-side connector 24 by mating the mating portion 16 and the mating portion 27. It should be noted that an engagement mechanism or a locking mechanism may be provided in the mating portions 16 and 27 in order to rigidly secure the sensor-side connector 14 with the substrate-side connector 24. In addition, upon mating of the mating portion 16 with the mating portion 27, the contact portion 17B of the terminal 17 of the sensor-side connector 14 makes contact with the contact portion 33B of the terminal 33 of the substrate-side connector 24 and presses down on the contact portion 33B. The contact portion 33B undergoes resilient deformation and is displaced forwardly, entering the displacement-permitting groove 31. This brings the contact portion 17B and the contact portion 33B into strong contact with each other and the two portions are electrically connected. Likewise, the mating portion 16 of the sensor-side connector 15 provided in the right end portion of the bobbin 7 of the magnetic sensor 5 enters the mating portion 27 of the substrate-side connector 25, thereby mating and securing the two portions to each other. At such time, the contact portion 17B of the terminal 17 of the sensor-side connector 15 is brought into strong contact with the contact portion 33B of the terminal 33 of the substrate-side connector 25, and the two portions are electrically connected. It should be noted that the engagement of the mating portion 16 and the mating portion 27 can be undone, for example by pulling the sensor unit 4 away from the substrate 35.

It should be noted that since the construction of each substrate-side connector 24, 25 possesses front-to-back symmetry, when the substrate-side connectors 24, 25 are provided on the substrate 35, no problem with the connection between the sensor-side connector 14 and the substrate-side connector 24 arises even if the front-to-back orientation of the substrate-side connector 24 is reversed, and no problem with the connection between the sensor-side connector 15 and the substrate-side connector 25 arises even if the front-to-back orientation of the substrate-side connector 25 is reversed.

(Installation of Magnetic Sensor Devices on Substrate)

As shown in FIG. 1, when the three magnetic sensor devices 3 are provided on the substrate 35 so as to form the rotation sensing device 1, the three magnetic sensor devices 3 are disposed at 120-degree intervals at the outer periphery of the magnetic field forming member 2; the three magnetic sensor devices 3 are disposed respectively equidistantly from the axis X of the rotary shaft 40; and, furthermore, the front portion of each magnetic sensor device 3 is disposed facing toward the axis X of the rotary shaft 40.

The procedure used to provide the three magnetic sensor devices 3 on the substrate 35 is as follows.

Figure 13:
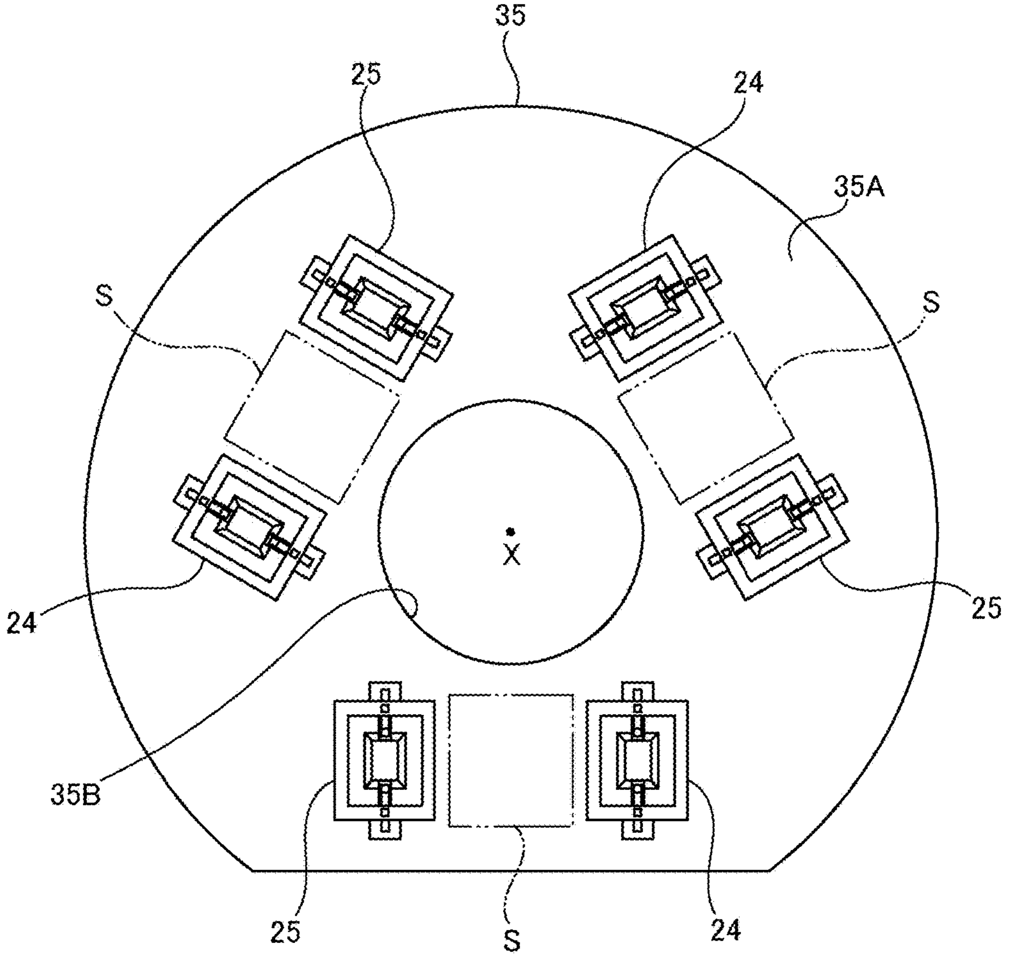
FIG. 13 is an illustrative view of a substrate-side connector in the magnetic sensor device according to the inventive embodiment provided on the substrate of the rotation sensing device.

As shown in FIG. 13, first, the substrate-side connectors 24, 25 of the three magnetic sensor devices 3 are surface mounted to the mounting face 35A of the substrate 35. When surface mounting the substrate-side connectors 24, 25 on the mounting face 35A of the substrate 35, the positions of the substrate-side connectors 24, 25 on the mounting face 35A of the substrate 35 are determined such that they are in positions corresponding to the positions of the sensor-side connectors 14, 15 in the three magnetic sensor devices 3 disposed as shown in FIG. 1. Subsequently, the bottom face of the housing 26 of the substrate-side connectors 24, 25 is placed on the mounting face 35A of the substrate 35. Placing the bottom face of the housing 26 of the substrate-side connector 24 on the mounting face 35A of the substrate 35 provides the substrate-side connector 24 on the mounting face 35A of the substrate 35 such that the mating portion 16 of the sensor-side connector 14 can be mated with the mating portion 27 of said substrate-side connector 24 from above the mating portion 27 of said substrate-side connector 24. In addition, placing the bottom face of the housing 26 of the substrate-side connector 25 on the mounting face 35A of the substrate 35 provides the substrate-side connector 25 on the mounting face 35A of the substrate 35 such that the mating portion 16 of the sensor-side connector 15 can be mated with the mating portion 27 of said substrate-side connector 25 from above the mating portion 27 of said substrate-side connector 25. Subsequently, the substrate connecting portion 33A of each terminal 33 of the substrate-side connectors 24, 25 is soldered by the reflow soldering technique to an electrically conductive portion provided on the mounting face 35A of the substrate 35. Soldering the substrate connecting portion 33A of each terminal 33 of the substrate-side connectors 24, 25 to an electrically conductive portion on the mounting face 35A electrically connects the terminals 33 of the substrate-side connectors 24, 25 to the electrically conductive portions of the substrate 35 while securing the substrate-side connectors 24, 25 to the substrate 35.

The sensor units 4 of the three magnetic sensor devices 3 are then connected to the substrate-side connectors 24, 25. Specifically, in each magnetic sensor device 3, the respective mating portions 16 of the sensor-side connectors 14, 15 of the magnetic sensor 5 secured to the casing 19 are mated with the respective mating portions 27 of the substrate-side connectors 24, 25 from above. This electrically connects the respective terminals 17 of the sensor-side connectors 14, 15 to the respective terminals 33 of the substrate-side connectors 24, 25. In addition, the sensor unit 4 is secured to the substrate 35.

Figure 14:
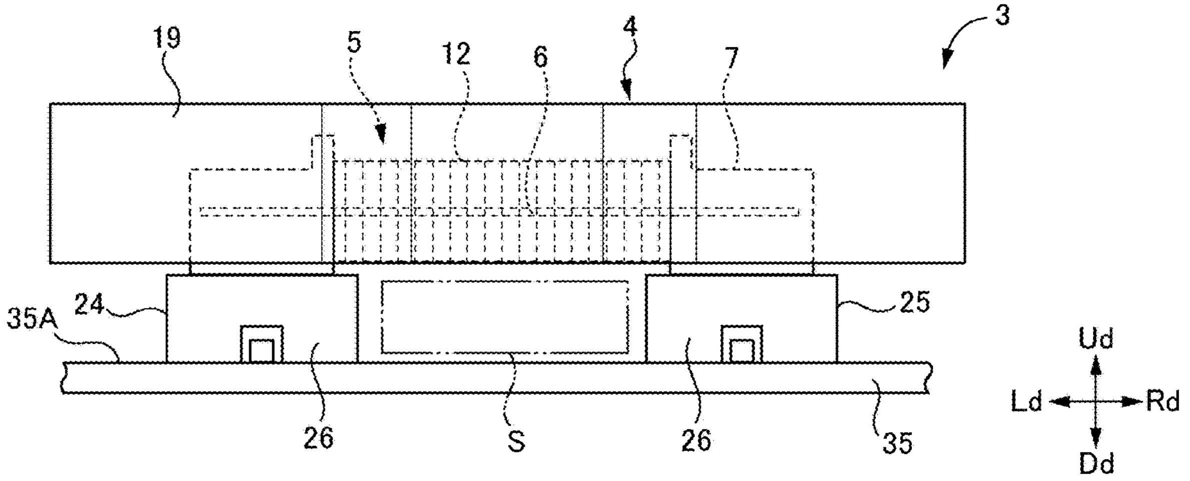
FIG. 14 is an illustrative front view of the magnetic sensor device according to the inventive embodiment provided on the substrate.

FIG. 14 illustrates one magnetic sensor device 3 provided on the substrate 35, as viewed from the front. In FIG. 14, the magnetic sensor 5 is shown in dashed lines, but the yoke 18 is not illustrated. As shown in FIG. 14, once the magnetic sensor device 3 is provided on the substrate 35, the substrate-side connectors 24, 25 of the magnetic sensor device 3 are disposed in a mutually spaced relationship on the mounting face 35A of the substrate 35. In addition, the housing 26 of the substrate-side connectors 24, 25 protrudes upwardly from the mounting face 35A of the substrate 35. In addition, the direction of extension of the magnetic wire rod 6 and the bobbin 7 of the magnetic sensor 5 is parallel to the mounting face 35A of the substrate 35. In addition, the sensor unit 4 is disposed so as to bridge the span between the mutually spaced substrate-side connector 24 and the substrate-side connector 25, as a result of which a space S where other electrical and electronic components can be mounted is formed between the lower face of the central part of the sensor unit 4 in the left-to-right direction (bottom portion of the outer peripheral surface of the coil 12 of the magnetic sensor 5) and the mounting face 35A of the substrate 35.

(Magnetic Field Sensing Operation of Magnetic Sensor Devices)

FIG. 15(A) illustrates the positional relationship of the magnetic sensors 5 and the yokes 18, as well as the magnetic field forming member 2, in the three magnetic sensor devices 3 provided on the substrate 35. Below, the magnetic field sensing operation of the magnetic sensor devices 3 is described by focusing on one magnetic sensor device 3 disposed at the top among the three magnetic sensors devices 3 in FIG. 15(A).

In FIG. 15(A), an S pole of the magnetic field forming member 2 has approached the left front of the magnetic sensor device 3 located at the top, and an N pole of the magnetic field forming member 2 has approached the right front of said magnetic sensor device 3. If the rotary shaft 40 rotates 90 degrees clockwise in this state, as shown in FIG. 15(B), an N pole of the magnetic field forming member 2 will approach the left front of said magnetic sensor device 3 and an S pole of the magnetic field forming member 2 will approach the right front of said magnetic sensor device 3. At such time, the direction of the magnetic field acting on the magnetic wire rod 6 of said magnetic sensor device 3 will be to the right. This causes the direction of magnetization of the magnetic wire rod 6, which was to the left an instant earlier, to be abruptly reversed to the right. As a result, as shown in FIG. 15(D) for example, a positive-going current pulse P1 is generated in the coil 12.

Figure 15:
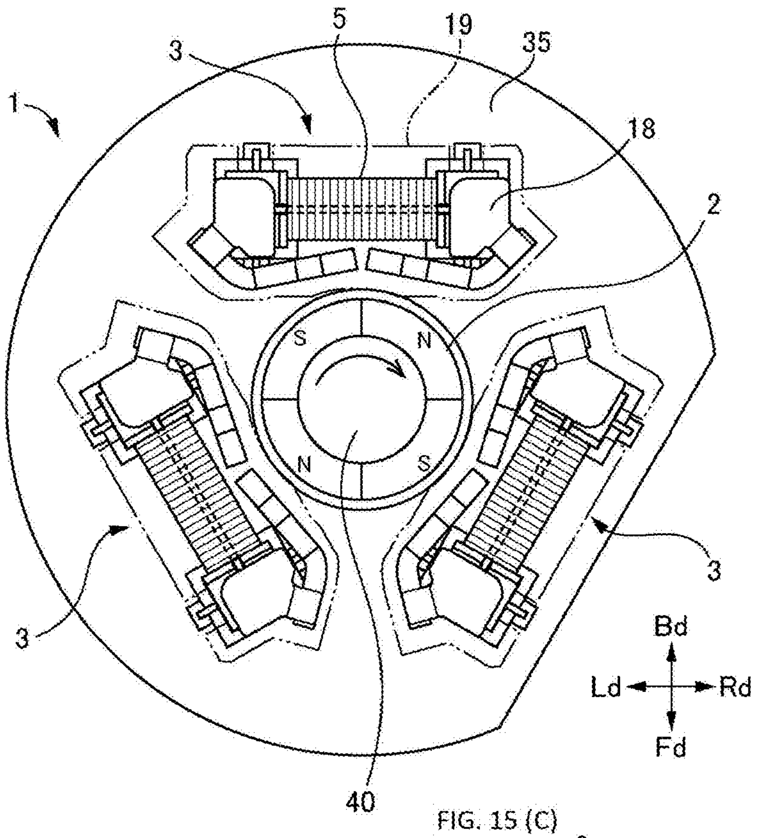
FIGS. 15(A) to 15(D) are illustrative views of the magnetic field sensing operation of the magnetic sensor device according to the inventive embodiment.
Figure 15:
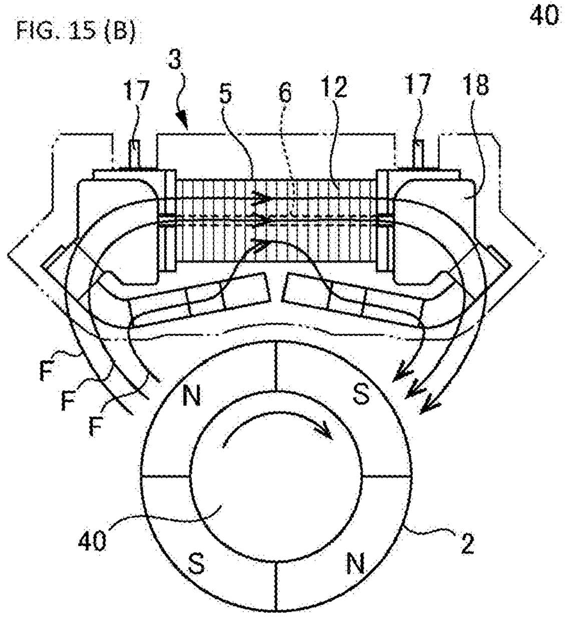
Figure 15:
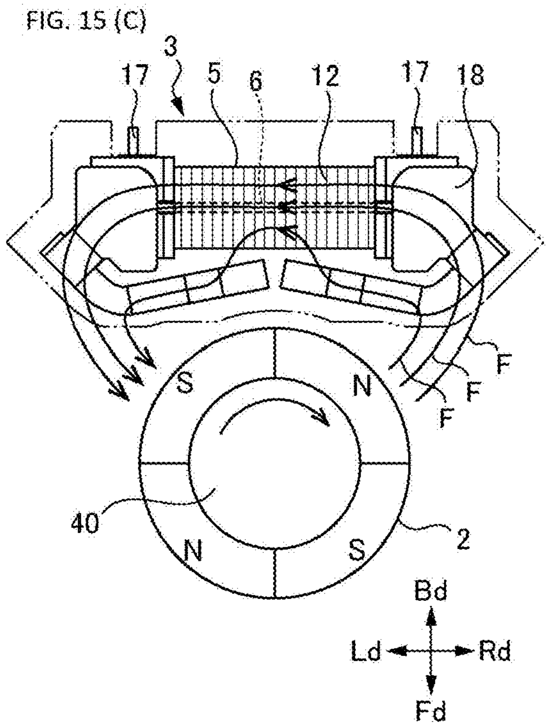
Figure 15:
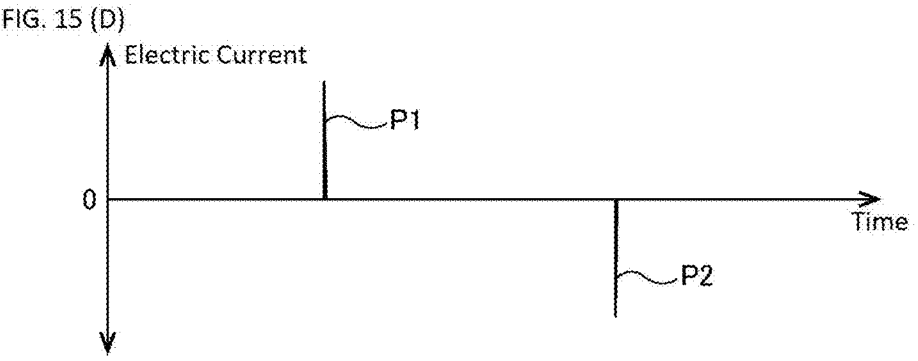

Thereafter, if the rotary shaft 40 rotates another 90 degrees clockwise, as shown in FIG. 15 (C), an S pole of the magnetic field forming member 2 will approach the left front of said magnetic sensor 3, and an N pole of the magnetic field forming member 2 will approach the right front of said magnetic sensor 3. At such time, the direction of the magnetic field acting on the magnetic wire rod 6 of said magnetic sensor device 3 will be to the left. This causes the direction of magnetization of the magnetic wire rod 6, which was to the right an instant earlier, to be abruptly reversed to the left. As a result, as shown in FIG. 15(D) for example, a negative-going current pulse P2 is generated in the coil 12.

One end of the insulated electrical wire 13 that forms the coil 12 is connected to a sensing circuit provided, for example, on the substrate 35, through the medium of the terminal 17 of the sensor-side connector 14, the terminal 33 of the substrate-side connector 24, and one electrically conductive portion provided on the mounting face 35A of the substrate 35. In addition, the other end of the insulated wire 13 that forms the coil 12 is connected to the aforementioned sensing circuit through the medium of the terminal 17 of the sensor-side connector 15, the terminal 33 of the substrate-side connector 25, and another electrically conductive portion provided on the mounting face 35A of the substrate 35. With such a configuration, the current pulses P1, P2 generated in the coil 12 are output as pulse signals to the aforementioned sensing circuit.

The aforementioned sensing circuit senses the amount and direction of rotation, etc., of the rotary shaft 40 based on the pulse signals respectively output from the coils 12 of the magnetic sensors 5 of the three magnetic sensor devices 3 provided on the substrate 35. It should be noted that, for example, the method described in International Publication No. 2016/002437 can be used as a method of sensing the amount and direction of rotation of the rotary shaft 40 in the rotation sensing device 1.

In addition, in order to increase the level of the current pulses generated in the coil 12 or to sharpen the waveform of the current pulses, it is desirable for the magnetic flux of the magnetic field formed by the two magnetic poles of the magnetic field forming member 2 approaching the left front and right front of the magnetic sensor device 3 to be focused on the magnetic wire rod 6. As shown in FIG. 15(B) or 15(C), a yoke 18 is disposed between the magnetic sensor 5 and the magnetic field forming member 2. The yoke 18 controls the direction of the magnetic flux such that the magnetic flux of the magnetic field formed by the two magnetic poles of the magnetic field forming member 2 approaching the left front and right front of the magnetic sensor device 3 is focused on the magnetic wire rod 6. The arrows F in FIGS. 15(B) and 15(C) indicate the flow of the magnetic flux whose direction is controlled by the yoke 18. Since the magnetic flux is focused on the magnetic wire rod 6 by the yoke 18, the magnetic flux flows along the direction of extension of the magnetic wire rod 6 and, in addition, the magnetic flux reliably passes through the magnetic wire rod 6.

As described above, the magnetic sensor device 3 according to the inventive embodiment comprises a sensor unit 4, which includes a magnetic sensor 5 and substrate-side connectors 24, 25, and the magnetic sensor 5 comprises sensor-side connectors 14, 15. Further, the magnetic sensor device 3 can be provided on the substrate 35 by surface mounting the substrate-side connectors 24, 25 to the mounting face 35A of the substrate 35 by the reflow soldering technique and, thereafter, connecting the sensor-side connectors 14, 15 to the substrate-side connectors 24, 25. The volume of the substrate-side connectors 24, 25 is smaller than the volume of the entire magnetic sensor device 3 and, for this reason, the heat capacity of the substrate-side connectors 24, 25 is smaller than the heat capacity of the entire magnetic sensor device 3. Therefore, the difference in heat capacity between the substrate-side connectors 24, 25 and other electrical and electronic components surface mounted to the mounting face 35A of the substrate 35 is smaller than the difference in heat capacity between the entire magnetic sensor device 3 and other electrical and electronic components surface mounted to the mounting face 35A of the substrate 35. Accordingly, the substrate-side connectors 24, 25 and other electrical and electronic components can be readily surface mounted to the mounting face 35A of the substrate 35 in one go by the reflow soldering technique. Therefore, the soldering workload required when providing the magnetic sensor devices 3 and other electrical and electronic components on the substrate 35 can be reduced.

In addition, as shown in FIG. 14, once a magnetic sensor device 3 is provided on the mounting face 35A of the substrate 35, a space S where other electrical and electronic components can be mounted is formed between the lower face of the central part of the sensor unit 4 in the left-to-right direction (bottom portion of the outer peripheral surface of the coil 12 of the magnetic sensor 5) and the mounting face 35A of the substrate 35. Therefore, this space S can be utilized to expand the space used for mounting other electrical and electronic components on the mounting face 35A of the substrate 35 and increase the number of other electrical and electronic components mounted on the mounting face 35A of the substrate 35.

In addition, the magnetic sensor device 3 can be readily attached to and detached from the substrate 35 by mating and unmating the sensor-side connectors 14, 15 and the substrate-side connectors 24, 25. Therefore, replacement, etc., of the magnetic sensor device 3 can be accomplished with ease.

In addition, the construction of the sensor unit 4 of the magnetic sensor device 3 integrates the magnetic sensor 5 and the yoke 18 through the medium of the casing 19. This facilitates attachment of the magnetic sensor 5 and the yoke 18 to the substrate 35 and, in addition, allows for increased accuracy of placement of the magnetic sensor 5 and the yoke 18 compared to when the magnetic sensor 5 and the yoke 18 are separate components isolated from each other.

In addition, integrating the yoke 18 with the casing 19 by insert molding makes it possible to afford greater ease of assembly of the sensor unit 4 and, in addition, increase the accuracy of placement of the magnetic sensor 5 and the yoke 18 even further.

In addition, since the magnetic field sensing performed by the magnetic sensor devices makes use of the large Barkhausen effect produced by the magnetic wire rods, it can be accomplished without a power supply.

Figure 16:
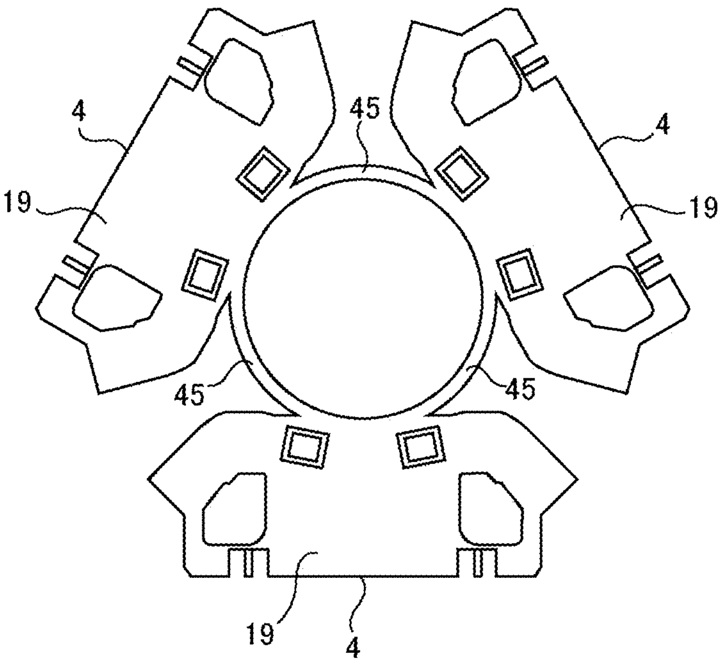
FIG. 16 is an illustrative view of a first variation of the magnetic sensor device according to the inventive embodiment.

It should be noted that, as shown in FIG. 16, the casings 19 of the sensor units 4 of the three magnetic sensor devices may be coupled through the medium of coupling portions 45.

Figure 17:
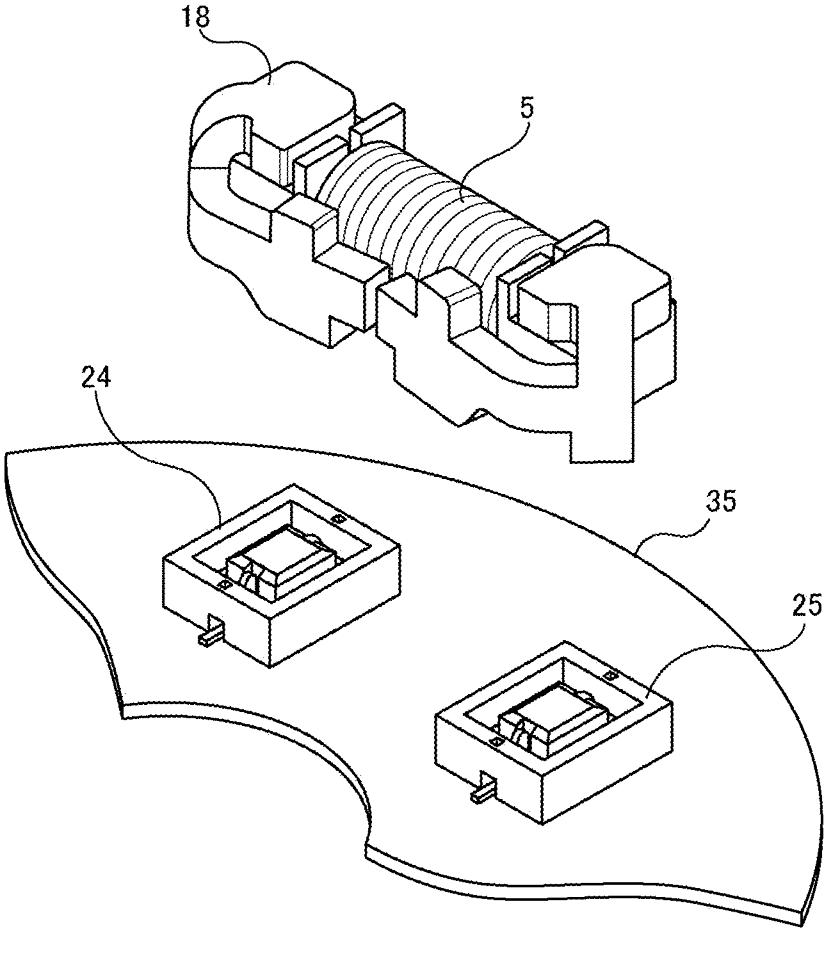
FIG. 17 is an illustrative view of a second variation of the magnetic sensor device according to the inventive embodiment.

In addition, although the aforementioned embodiment described an example in which the magnetic sensor 5 and the yoke 18 were integrated through the medium of the casing 19, the present invention is not limited thereto. For instance, as shown in FIG. 17, the magnetic sensor 5 and the yoke 18 may be integrated, for example, by screw fastening, bonding with adhesives, and other means without using a casing.

In addition, although the substrate-side connector 24 of the aforementioned embodiment has two terminals 33 provided therein, there may just one terminal 33 provided in the substrate-side connector 24. The same applies to the substrate-side connector 25.

Figure 18:
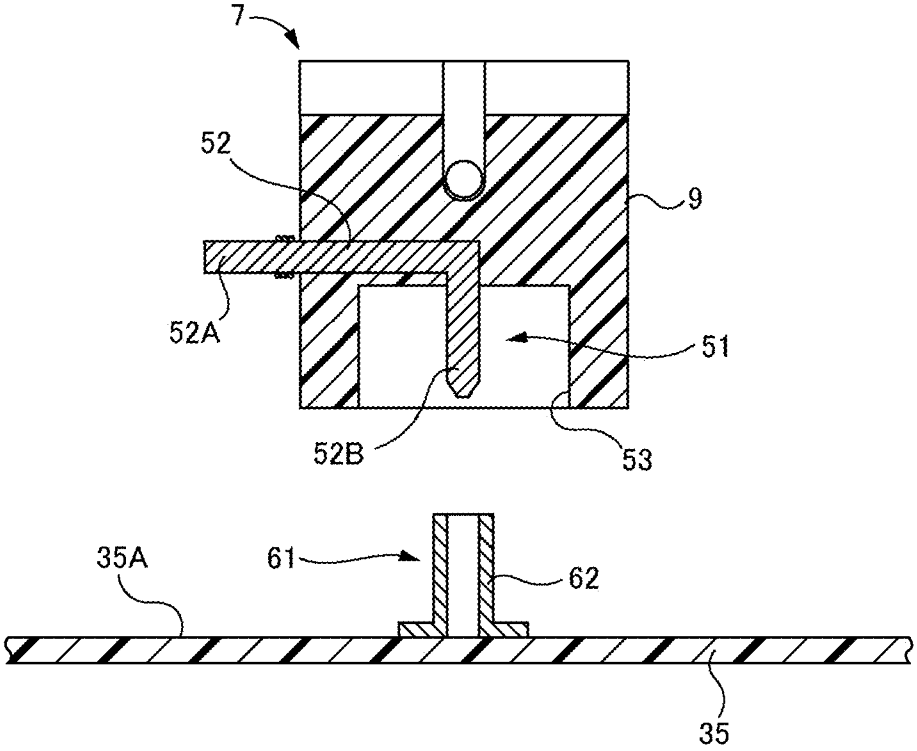
FIG. 18 is an illustrative view of a third variation of the magnetic sensor device according to the inventive embodiment.

In addition, in the aforementioned embodiment, a sensor-side connector 14 comprising a mating portion 16 and a terminal 17 is provided at one end of the bobbin 7 of the magnetic sensor 5, and, on the substrate 35, there is provided a housing 26 having a mating portion 27 and a substrate-side connector 24 comprising terminals 33 as a connector to which this sensor-side connector 14 is connected. However, for example, the sensor-side connector 51 shown in FIG. 18 may be provided at one end of the bobbin 7 of the magnetic sensor 5, and, on the substrate 35, the substrate-side connector 61 shown in FIG. 18 may be provided as a connector to which this sensor-side connector 51 is connected. In FIG. 18, the sensor-side connector 51 is configured with a terminal 52 only, which has an electrical wire connecting portion 52A and a contact portion 52B. In addition, the contact portion 52B is disposed within a recess portion 53 provided in the bottom face of the wire rod supporting portion 9 of the bobbin 7. On the other hand, the substrate-side connector 61 is formed with a sleeve-shaped terminal 62 only. The terminal 62, which is surface mounted to the mounting face 35A of the substrate 35, is upwardly open. The contact portion 52B of the terminal 52 is mated with (inserted into) the sleeve-shaped terminal 62 from above. This connects the sensor-side connector 51 to the substrate-side connector 61. As this construction reveals, the contact portion 52B of the terminal 52 of the sensor-side connector 51 and the sleeve-shaped terminal 62 of the substrate-side connector 61 can each serve as a mating portion. For this reason, the terminal 52 of the sensor-side connector 51 is both a terminal and a mating portion, and the terminal 62 of the substrate-side connector 61 is both a terminal and a mating portion. Likewise, the sensor-side connector 51 shown in FIG. 18 may be provided at the other end of the bobbin 7 of the magnetic sensor 5, and the substrate-side connector 61 shown in FIG. 18 may be provided on the substrate 35 as a connector to which the sensor-side connector 51 provided at the other end of the bobbin 7 of the magnetic sensor 5 is connected.

In addition, the inventive magnetic sensor device may also be implemented in an embodiment that does not employ a yoke. In addition, the inventive magnetic sensor device is applicable to devices other than rotation sensing devices.

In addition, the present invention can be modified as appropriate where consistent with the essence or concept of the invention that can be read from the claims and the description in their entirety, and magnetic sensor devices featuring such modifications are also included within the technical concept of the present invention.

DESCRIPTION OF THE REFERENCE NUMERALS

- 3 Magnetic sensor device
- 5 Magnetic sensor
- 6 Magnetic wire rod
- 7 Bobbin
- 12 Coil
- 13 Insulated electrical wire (electrical wire)
- 14, 15, 51 Sensor-side connectors (first connector, second connector)
- 16 Mating portion (first mating portion, second mating portion)
- 17, 52 Terminals (first terminal, second terminal)
- 18 Yoke
- 19 Casing
- 24, 25, 61 Substrate-side connectors (third connector, fourth connector)

27 Mating portion (third mating portion, fourth mating portion)
33, 62 Terminals (third terminal, fourth terminal)
35 Substrate

The invention claimed is:

1. A magnetic sensor device, comprising:

a magnetic sensor, which comprises a magnetic wire rod that generates a Barkhausen effect, a bobbin having the magnetic wire rod disposed therein, a coil formed by winding an electrical wire around the bobbin, a first connector provided at one end of the bobbin, and a second connector provided at an other end of the bobbin, the magnetic sensor being provided on a substrate;

a third connector detachably connected to the first connector; and a fourth connector detachably connected to the second connector, wherein the first connector comprises a first mating portion and a first terminal to which one end of the electrical wire is connected, the second connector comprises a second mating portion and a second terminal to which the other end the electrical wire is connected, the third connector comprises a third mating portion mated with the first mating portion and a third terminal making contact with the first terminal upon mating of the first mating portion with the third mating portion, and the fourth connector comprises a fourth mating portion mated with the second mating portion and a fourth terminal making contact with the second terminal upon mating of the second mating portion with the fourth mating portion, the third connector and the fourth connector are mounted on a surface of the substrate facing the bobbin.

2. The magnetic sensor device according to claim 1, wherein the coil is provided between one end and the other end of the bobbin, the first connector is provided in a bottom portion of one end of the bobbin, the second connector is provided in the bottom portion of the other end of the bobbin, the third connector is provided on a top face of the substrate such that the first mating portion can be mated with the third mating portion from above the third mating portion, the fourth connector is provided on the top face of the substrate such that the second mating portion can be mated with the fourth mating portion from above the fourth mating portion, the third connector and the fourth connector are disposed so as to be spaced apart from each other on the top face of the substrate and, once the first mating portion has been mated with the third mating portion from above the third mating portion and the second mating portion has been mated with the fourth mating portion from above the fourth mating portion, the magnetic wire rod and the bobbin extend parallel to the top face of the substrate, and a space is formed between the bottom portion of an outer peripheral surface of the coil and the top face of the substrate.

3. The magnetic sensor device according to claim 1, wherein the third connector and the fourth connector are each surface mounted to the substrate.

4. The magnetic sensor device according to claim 1, further comprising a yoke that controls a direction of a magnetic flux of an external magnetic field, wherein the yoke is secured to the magnetic sensor.

5. The magnetic sensor device according to claim 1, further comprising a yoke that controls a direction of a magnetic flux of an external magnetic field, and a casing in which the magnetic sensor is accommodated, wherein the yoke is secured to the casing.

6. The magnetic sensor device according to claim 5, wherein the yoke is integrated with the casing by insert molding.

* * * * *